United States Patent [19]
Palmade et al.

[11] Patent Number: 6,032,902
[45] Date of Patent: Mar. 7, 2000

[54] CONSTELLATION OF NON-GEOSTATIONARY SATELLITES PROVIDING PERMANENT COVERAGE

[75] Inventors: Jean-Luc Palmade, Aucamville; Eric Frayssinhes, Toulouse; Erick Lansard, Ramonville-Ste-Agne, all of France

[73] Assignee: Alcatel Espace, Nanterre Cedex, France

[21] Appl. No.: 08/877,507

[22] Filed: Jun. 17, 1997

[30] Foreign Application Priority Data

Jun. 18, 1996 [FR] France .................................. 96-07539

[51] Int. Cl.[7] ........................................ B64G 1/00
[52] U.S. Cl. ......................................... 244/158 R
[58] Field of Search ............... 244/158 R, 164; 45/12.1, 13.1, 13.2, 427, 430; 701/226; 342/352, 356

[56] References Cited

U.S. PATENT DOCUMENTS

| | | | |
|---|---|---|---|
| 5,931,417 | 8/1999 | Castiel ................................. | 244/158 R |
| 5,957,409 | 9/1999 | Castiel et al. ........................ | 244/158 R |
| 5,963,862 | 10/1999 | Adiwoso et al. ...................... | 455/12.1 |

FOREIGN PATENT DOCUMENTS

| | | |
|---|---|---|
| 0588697A1 | 3/1994 | European Pat. Off. . |
| WO9513671 | 5/1995 | WIPO . |
| WO9612356 | 4/1996 | WIPO . |

OTHER PUBLICATIONS

F. Ananasso, "Global Satellite Networks; Effectively Deploying Worldwide Communication Infrastructures", Annual Review of Communications, vol. 49, Jan. 1, 1996, pp. 947–958.

C. Wang, "Performance Modeling of a Class of Low Earth Orbit Satellite Networks", Proceedings of the Global Telecommunications Conference (GLOBECOM), Houston, Nov. 29–Dec. 2, 1993, vol. 1 of 4, Nov. 29, 1993, Instititute of Electrical and Electronics Engineers, pp. 569–573.

*Primary Examiner*—Peter M. Poon
*Assistant Examiner*—Charles R. Ducker, Jr.
*Attorney, Agent, or Firm*—Sughrue, Mion, Zinn, Macpeak & Seas, PLLC

[57] ABSTRACT

The invention relates to a communications and/or navigation system based on a constellation of non-geostationary satellites in orbit around the terrestrial globe. The constellation has satellites grouped in pairs, and has orbital planes that are also grouped in pairs. The pairs of orbital planes are mutually spaced apart by an angle that is different from the spacing between the orbital planes in a pair of orbital planes, and the satellites in a pair have orbital phase offsets different from the orbital phase offset between pairs of satellites in different pairs of orbital planes. This type of constellation makes it possible to ensure continuous coverage, via at least one satellite, of a geographical zone of interest, while taking into consideration the frequency-coordination constraint.

2 Claims, 2 Drawing Sheets

FIG. 1
FIG. 2
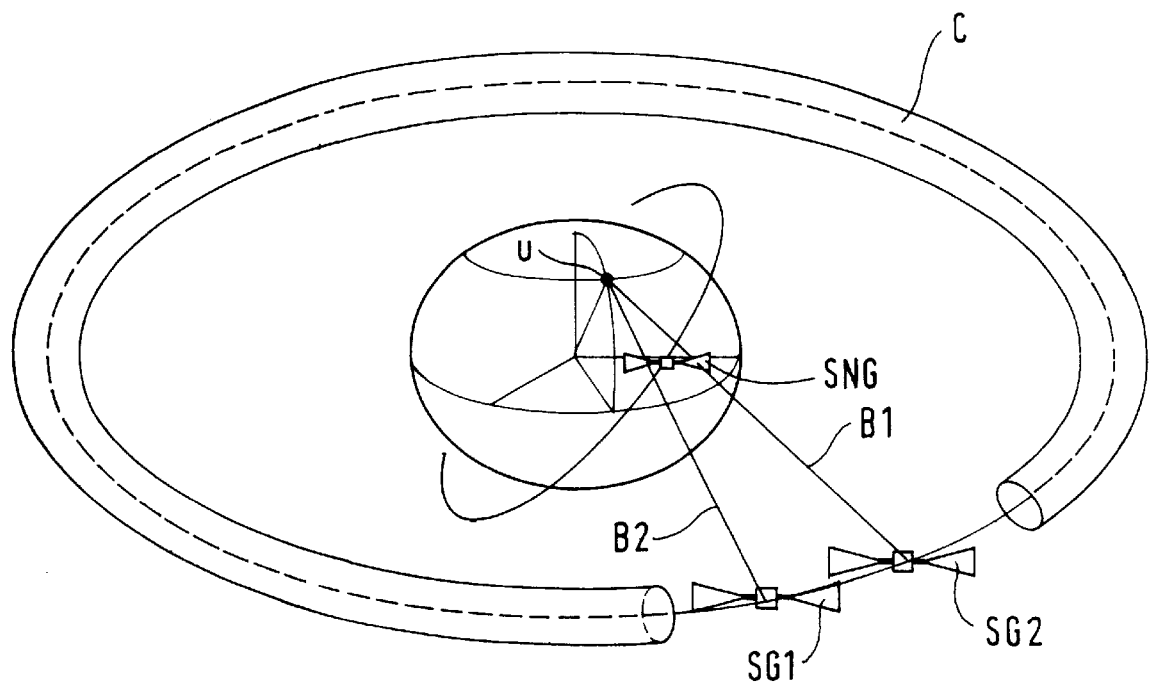
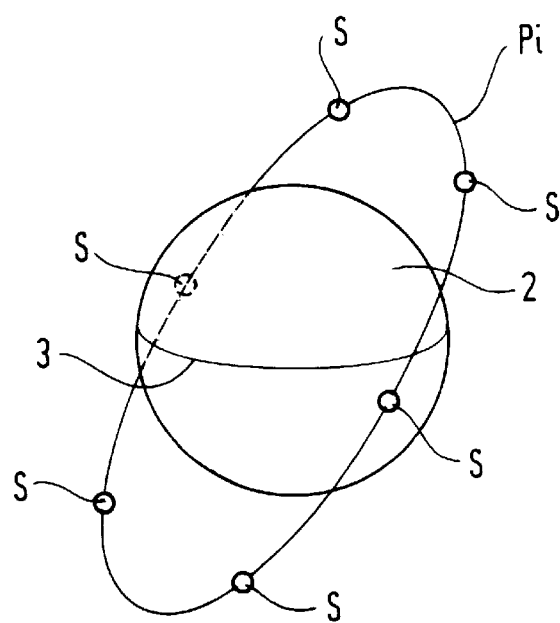

CONSTELLATION OF NON-GEOSTATIONARY SATELLITES PROVIDING PERMANENT COVERAGE

The invention relates to a communications and/or navigation system based on a constellation of non-geostationary satellites distributed in orbital planes around the terrestrial globe.

BACKGROUND OF THE INVENTION

Novel communications and/or navigation systems by means of satellite are making ever-increasing use of satellites that are in non-geostationary orbits, e.g. satellites in low earth orbit (LEO), or satellites in medium or high earth orbit (MEO, HEO, . . . ), which orbits may be circular or elliptical, and implementing a large number of such satellites in order to ensure complete coverage of a geographical zone of interest which is generally worldwide or multi-regional. In such systems, the satellites are generally all on similar orbits, i.e. orbits having the same altitude and the same inclination.

Certain frequency bands, e.g. the Ku, Ka, L, etc. bands, are most advantageous for such novel systems, but they suffer from the drawback of also being used by numerous satellites for telecommunications and/or navigation systems that are in geostationary orbit.

It follows that radio links established from such non-geostationary satellites of such novel systems need to comply with the frequency-coordination rules laid down by the National Telecommunications Union so as to avoid interfering with or being interfered by other systems, whether in space or otherwise. FIG. 1 shows the geometrical conditions for radio interference on a link between a terrestrial user U and one or more satellites SG1 or SG2 in the geostationary belt C by means of a non-geostationary satellite SNG. Interference exists if there is sufficient alignment between the user, the non-geostationary satellite, and a geostationary satellite, as shown in FIG. 1 by the two lines B1 and B2.

Frequency coordination requires the operator of any such new system to ensure that the radio link established between a non-geostationary satellite and the surface of the terrestrial globe is interrupted whenever the satellite is in alignment with a geostationary satellite and a terrestrial user (to within a certain tolerance), and that contributes to increasing the number of non-geostationary satellites that are needed for providing continuous service over a geographical zone of interest, and therefore results in an increase in the cost of such novel systems.

Numerous studies have already been performed on the problem of complete and permanent coverage of the terrestrial globe by non-geostationary satellites. These studies have led to so-called "symmetrical" satellite constellations such as those of Messieurs Walker, Rider, Ballard, or others. In such known constellations, the orbital planes and the positions of non-geostationary satellites are uniformly distributed. In particular, satellites situated in the same orbital plane are thus equidistant and the orbital planes are uniformly distributed in the terrestrial equatorial plane (Walker and Ballard) or in the terrestrial equatorial half-plane (Rider).

OBJECT AND SUMMARY OF THE INVENTION

The object of the invention is to provide a communications and/or navigation system based on a different type of constellation of satellites in non-geostationary orbit, making it possible to guarantee continuous coverage of a geographical zone of interest, e.g. the surface of the terrestrial globe, by means of at least one satellite, while taking account of the frequency-coordination constraint, and to do so in a manner that is more effective than by recourse to a conventional symmetrical constellation that is optimal in the sense of coverage by at least two satellites, after taking the coordination constraint into account.

To this end, the invention provides a communications and/or navigation system based on a constellation of non-geostationary satellites distributed in orbital planes around the terrestrial globe, wherein, in the constellation:

the orbital planes are distributed in pairs, with pairs of orbital planes being regularly spaced apart relative to one another in the equatorial plane of the terrestrial globe, and with the spacing between two successive pairs of orbital planes differing from the spacing between two orbital planes in the same pair of orbital planes; and the satellites are distributed in pairs within the pairs of orbital planes, the satellites of a pair of satellites being distributed in different orbital planes of the same pair of orbital planes, the two satellites in the same pair of satellites having a first orbital offset relative to each other, and, in two successive pairs of orbital planes, the pairs of satellites in the first pair of orbital planes and the pairs of satellites in the second pair of orbital planes present a second orbital offset between each other that is not equal to the first orbital offset nor to twice said offset.

In a particular embodiment of the invention, the pairs of orbital planes in a given pair of orbital planes coincide.

Independently of the problem of frequency coordination, it will be observed that this geometrical structure for the constellation of the invention can advantageously satisfy complex problems of availability and/or coverage capacity. More particularly, this principle of doubling up the orbital planes and the satellites within the orbital planes with certain offsets between grouped-together planes or between grouped-together satellites as mentioned above makes it possible, compared with conventional constellations such as Walker constellations, and for a given number of satellites, to achieve satellite constellations that are optimized for a navigation system, for a telecommunications system, or for a multimedia system, in particular, presenting increased resistance to degradation and/or increased coverage capacity in certain coverage zones of interest, such as latitudes in the range 20° to 60°.

BRIEF DESCRIPTION OF THE DRAWINGS

An embodiment of the invention is described below in detail with reference to the drawings.

FIG. 1 is a diagram showing the geometrical conditions for radio interference between a non-geostationary satellite and a link between a terrestrial user and satellites in the geostationary belt.

FIG. 2 is a diagram showing a particular orbital plane for a conventional symmetrical constellation, in which non-geostationary satellites are uniformly distributed on the orbital plane.

In the figures, the same references designate elements that are identical.

MORE DETAILED DESCRIPTION

FIG. 2 is highly diagrammatic and shows an orbital plane of a conventional symmetrical constellation of non-geostationary satellites, e.g. a Walker symmetrical constellation, using a small number of non-geostationary satellites, in this case six satellites all referenced S. It can be seen that these non-geostationary satellites are uniformly offset relative to one another in the orbital plane Pi about the surface of the terrestrial globe 2. In this type of known constellation, the orbital planes such as Pi are regularly spaced relative to one another in the terrestrial equatorial plane 3.

The family of constellations for a communications and/or navigation system of the invention does not have this regularity of orbital plane distribution in the equatorial plane, nor does it have this regularity of satellite distribution within the orbital planes.

More precisely, in a constellation of the invention, the orbital planes are distributed in pairs, and pairs of orbital planes are regularly spaced apart from one another in the equatorial plane of the terrestrial globe.

Figure 3:
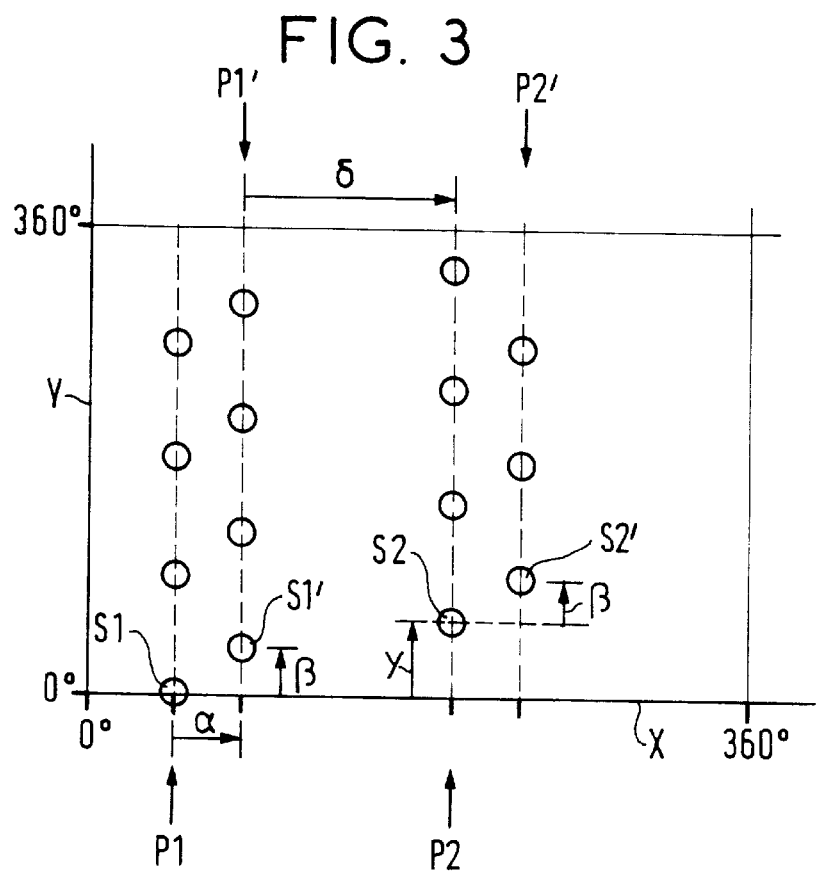
FIG. 3 is a chart for a constellation of the invention showing diagrammatically how satellites can be grouped in pairs of satellites and in pairs of orbital planes, showing the spacing between pairs of orbital planes and between the orbital planes within a pair, and showing the orbital offsets between satellites within the same pair and between pairs of satellites in different orbital plane.

FIG. 3 is a chart where the abscissa X shows the positions of orbital planes in the terrestrial equatorial plane, while the ordinate Y shows the orbital positions of non-geostationary satellites in said planes.

By way of example, FIG. 3 shows two pairs of orbital planes (P1,P1') and (P2,P2') that are spaced apart by an angle 6 along the X axis. Also, as visible in this figure, the angular spacing δ between two successive pairs of orbital planes such as (P1,P1') and (P2,P2') is different from the angular spacing α between two orbital planes in a given pair of orbital planes such as P1 and P1' or P2 and P2'.

It can also be seen from FIG. 3 that satellites such as S1 and S1' are distributed in pairs within the pairs of orbital planes such as (P1,P1'), and that the satellites within a given pair of satellites such as S1 and S1' are distributed in orbital planes that are different for a given pair of orbital planes, in this case P1 and P1'. Also, relative to each other, the two satellites in a given pair of satellites such as S1 and S1' or S2 and S2' present a first orbital offset of angle β on the axis Y of orbital positions.

Finally, in two successive pairs of orbital planes, e.g. the pairs (P1,P1') and (P2,P2'), the pairs of satellites in the first pair of orbital planes, e.g. the pair (S1,S1'), and the pairs of satellites in the second pair of orbital planes, e.g. the pair (S2,S2') present a second orbital offset between each other, in this case the angle γ along the Y axis, that is not equal to the first orbital offset of angle β, and that is not equal to twice said offset.

The two orbital planes of a pair of orbital planes may coincide, such that the angle a may be of value zero if particular advantage is to be given to the costs associated with installing and maintaining the constellation, even if that should possibly be to the detriment of technical performance.

Figure 4:
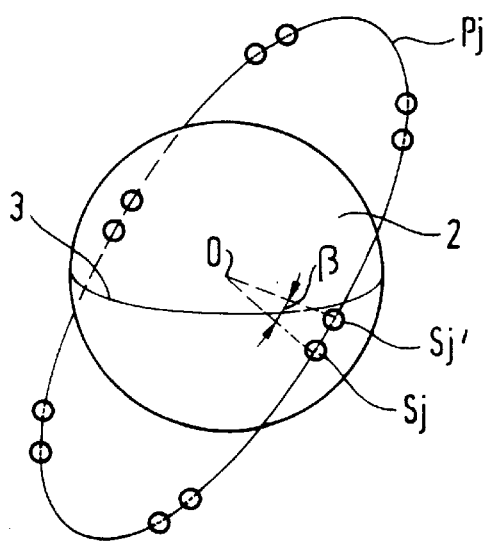
FIG. 4 shows an orbital offset between satellites constituting a single pair of the invention.

In a single orbital plane Pj, FIG. 4 shows the orbital offset of angle β between two satellites within the same pair, in this case the satellites Sj and Sj'. In this figure, the two planes of a pair of orbital planes coincide, with O designating the center of the terrestrial globe.

Figure 5:
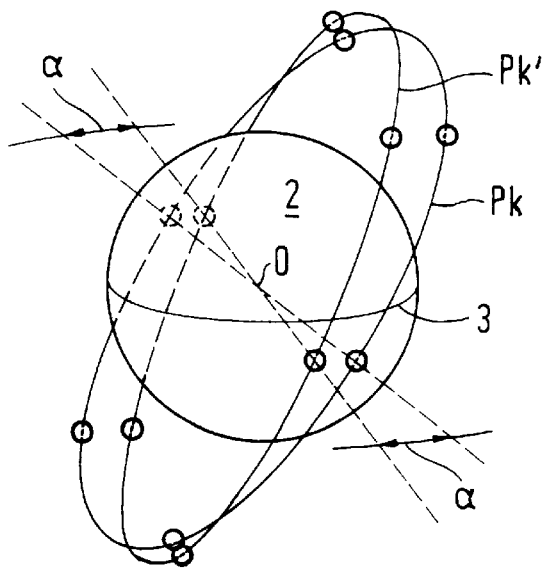
FIG. 5 shows the spacing between the terrestrial equatorial plane and two orbital planes for a given pair of orbital planes of the invention.

FIG. 5 shows spacing by an angle α in the terrestrial equatorial plane 3 between the two orbital planes Pk and Pk' of a single pair when they do not coincide.

For symmetrical constellations of the Walker or Rider kind, the following relationships apply for the angles α, β, δ, and γ, expressed in degrees:

Walker: δ=α=360/P degrees
 β is an integer multiple of 360/T degrees
 γ=2β
  where:
  T is an arbitrary integer number of satellites;
  P is an integer number of orbital plans, P being a divider of T; and
  T/P is the number of satellites per orbital plane.

Rider: δ=α=180/P degrees
 β is arbitrary and y=2β.

In the context of a family of constellations of the invention, the following relationships apply:

δ≠α

γ≠2β

α+δ is an integer multiple of 360/P degrees,
 where
 T is an arbitrary even integer number of satellites;
 P is an even integer number of orbital planes where P is a divisor of T; and
 T/P is the number of satellites per orbital plane.

The angles α, β, δ, and γ are calculated as a function of the number of orbital planes and as a function of the number of satellites so as to guarantee continuous coverage by at least one satellite of the geographical zone of interest, while satisfying the frequency-coordination constraint. In the method of operation of the communications and/or navigation system of the invention, each satellite which is in alignment with a user on the surface of the terrestrial globe and the geostationary belt interrupts its radio link, with the link being taken over by another non-geostationary satellite which is not in the interfering position.

The invention is described above with the help of drawings showing only two pairs of orbital planes, however it is clear that the invention extends to constellations that can include a greater number of pairs of planes, e.g. eight pairs of planes, with each plane containing an arbitrary number of satellites. Also, the invention extends to constellations in which additional satellites are associated with the pairs of satellites, particularly when it is desired to increase availability and/or coverage capacity of the communications system.

We claim:

1. A communications and/or navigation system based on a constellation of non-geostationary satellites distributed in orbital planes around the terrestrial globe, wherein, in the constellation:

the orbital planes are distributed in pairs, with pairs of orbital planes being regularly spaced apart relative to one another in the equatorial plane of the terrestrial globe, and with the spacing between two successive pairs of orbital planes, differing from the spacing between two orbital planes in the same pair of orbital planes; and the satellites are distributed in pairs in the pairs of orbital planes, the satellites of a pair of satellites being distributed in different orbital planes of the same pair of orbital planes, the two satellites in the same pair of satellites having a first orbital offset relative to each other, and, in two successive pairs of orbital planes, the pairs of satellites in the first pair of orbital planes and the pairs of satellites in the second pair of orbital planes present a second orbital offset between each other that is not equal to the first orbital offset nor to twice said offset.

2. A system according to claim 1, in which the pairs of orbital planes in a given pair of orbital planes coincide.

* * * * *